(12) United States Patent
Ahmad et al.

(10) Patent No.: US 10,403,880 B2
(45) Date of Patent: Sep. 3, 2019

(54) APPARATUS AND METHOD FOR PROCESSING BATTERY ELECTRODES

(71) Applicants: Iftikhar Ahmad, Raleigh, NC (US);
Andrew Cardin, Cary, NC (US);
Clayton DeCamillis, Raleigh, NC (US);
Michael Hampton, Raleigh, NC (US);
James E. Webb, Jr., Garner, NC (US);
Pu Zhang, Ann Arbor, MI (US);
William Hicks, Saline, MI (US); Peter H. Aurora, Ann Arbor, MI (US)

(72) Inventors: Iftikhar Ahmad, Raleigh, NC (US);
Andrew Cardin, Cary, NC (US);
Clayton DeCamillis, Raleigh, NC (US);
Michael Hampton, Raleigh, NC (US);
James E. Webb, Jr., Garner, NC (US);
Pu Zhang, Ann Arbor, MI (US);
William Hicks, Saline, MI (US); Peter H. Aurora, Ann Arbor, MI (US)

( * ) Notice: Subject to any disclaimer, the term of this patent is extended or adjusted under 35 U.S.C. 154(b) by 400 days.

(21) Appl. No.: 15/330,272

(22) Filed: Sep. 1, 2016

(65) Prior Publication Data
US 2017/0077491 A1 Mar. 16, 2017

Related U.S. Application Data

(60) Provisional application No. 62/283,785, filed on Sep. 11, 2015.

(51) Int. Cl.
*H01M 4/04* (2006.01)
*F26B 13/00* (2006.01)
(Continued)

(52) U.S. Cl.
CPC ............. *H01M 4/0471* (2013.01); *F26B 3/04* (2013.01); *F26B 3/343* (2013.01); *F26B 3/347* (2013.01);
(Continued)

(58) Field of Classification Search
None
See application file for complete search history.

(56) References Cited

U.S. PATENT DOCUMENTS

| 5,321,222 | A | 6/1994 | Bible et al. |
| 6,399,411 | B1 * | 6/2002 | Hori .................... C23C 14/562 |
| | | | 118/718 |

(Continued)

OTHER PUBLICATIONS

Ebner et al. Tortuosity anisotropy in lithium-ion battery electrodes. Advanced Energy Materials 4, No. 5. Oct. 29, 2012.
(Continued)

*Primary Examiner* — Ibrahime A Abraham
*Assistant Examiner* — Elizabeth M Sims
(74) *Attorney, Agent, or Firm* — Robert J. Lauf

(57) ABSTRACT

An apparatus for processing battery electrodes includes: a microwave applicator cavity with slots on opposite ends to allow a continuous sheet to move through the cavity in a first direction; a processing chamber constructed of microwave-transparent material, disposed within the applicator cavity and surrounding the continuous sheet, the processing chamber having slots to allow the continuous sheet to pass through it; a microwave power supply to deliver power to the applicator cavity; a source of heated gas providing a controlled gas flow through the processing chamber in a direction opposite the first direction; and, at least one non-contacting temperature measuring device positioned to measure a surface temperature at a selected location on the continuous sheet as it passes through the processing chamber. The apparatus is particularly suited for removing polar solvents from porous electrode coatings. A related method is also disclosed.

14 Claims, 8 Drawing Sheets

(51) Int. Cl.
  *F26B 3/04*    (2006.01)
  *F26B 3/34*    (2006.01)
  *F26B 3/347*   (2006.01)
  *B05C 9/12*    (2006.01)
  *B05C 9/14*    (2006.01)
  *H01M 4/1391*  (2010.01)
  *H01M 4/1393*  (2010.01)
  *H01M 10/052*  (2010.01)

(52) U.S. Cl.
  CPC ........... *F26B 13/00* (2013.01); *H01M 4/0404* (2013.01); *H01M 4/1391* (2013.01); *H01M 4/1393* (2013.01); *B05C 9/12* (2013.01); *B05C 9/14* (2013.01); *H01M 10/052* (2013.01)

(56) References Cited

U.S. PATENT DOCUMENTS

| | | | | |
|---|---|---|---|---|
| 9,750,091 | B2* | 8/2017 | Ahmad | H05B 6/6482 |
| 2004/0106030 | A1* | 6/2004 | Wixom | C08F 226/06 |
| | | | | 429/494 |
| 2005/0236395 | A1* | 10/2005 | Timans | C30B 31/12 |
| | | | | 219/497 |
| 2007/0215612 | A1* | 9/2007 | Hicks | H05B 6/704 |
| | | | | 219/746 |
| 2008/0060173 | A1* | 3/2008 | Zhang | A44B 18/0011 |
| | | | | 24/442 |
| 2008/0311280 | A1* | 12/2008 | Rego | B05D 1/02 |
| | | | | 427/2.24 |
| 2011/0067260 | A1* | 3/2011 | Kim | B05D 3/0254 |
| | | | | 34/201 |
| 2012/0211486 | A1* | 8/2012 | Kasai | H01L 21/67017 |
| | | | | 219/679 |
| 2013/0152421 | A1* | 6/2013 | Fricker | F26B 13/08 |
| | | | | 34/412 |
| 2013/0183568 | A1* | 7/2013 | Babinec | H01M 2/166 |
| | | | | 429/142 |
| 2014/0038431 | A1* | 2/2014 | Stowell | H01L 21/324 |
| | | | | 438/795 |
| 2014/0103030 | A1* | 4/2014 | Ahmad | H05B 6/6482 |
| | | | | 219/680 |
| 2014/0328729 | A1* | 11/2014 | Chen | C01B 13/14 |
| | | | | 422/187 |
| 2015/0255780 | A1* | 9/2015 | Tsuchiya | F26B 13/10 |
| | | | | 427/58 |

OTHER PUBLICATIONS

Sheng et al. Effect of calendering on electrode wettability in lithium-ion batteries. Frontiers in Energy Research, vol. 2, Article 56: 1-8. Dec. 5, 2014.

* cited by examiner

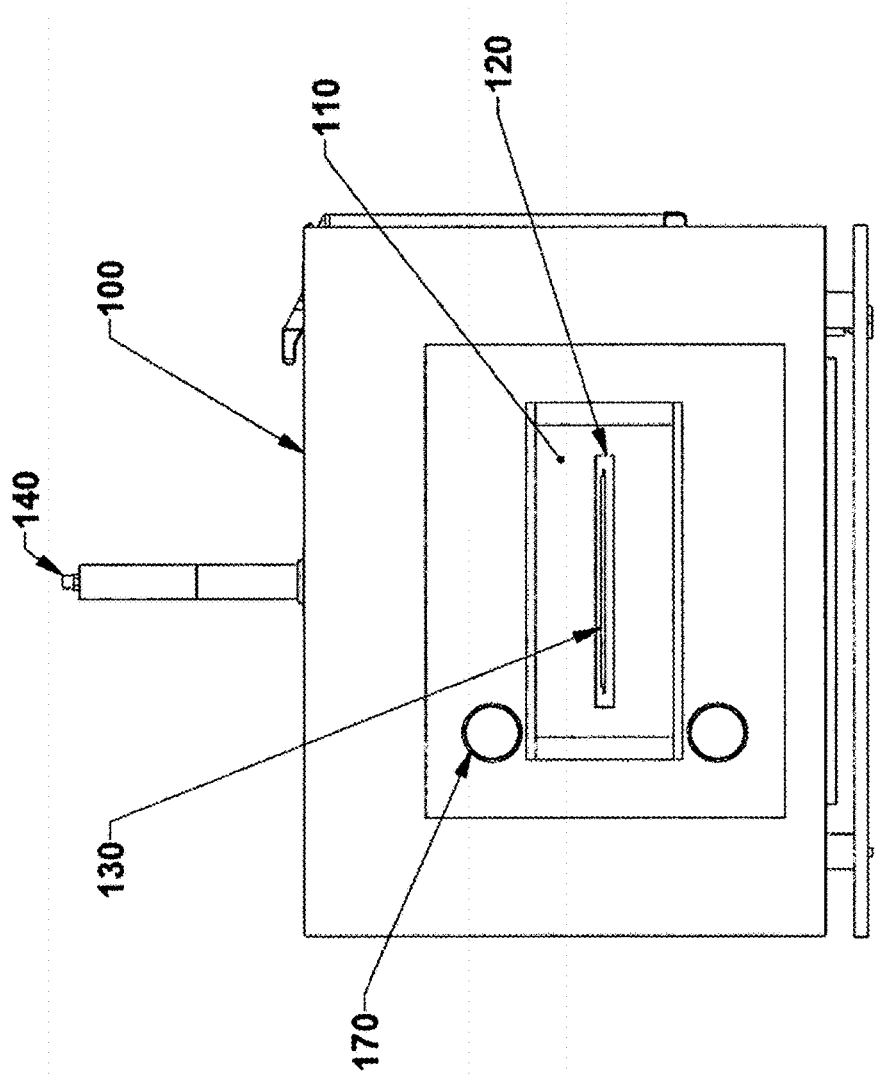

APPARATUS AND METHOD FOR PROCESSING BATTERY ELECTRODES

CROSS-REFERENCE TO RELATED APPLICATIONS

This application claims the benefit of Provisional Patent Application No. 62/283,785, entitled, Apparatus and method for drying battery electrodes, filed on Sep. 11, 2015 by the present inventors, the entire disclosure of which is incorporated herein by reference.

STATEMENT REGARDING FEDERALLY SPONSORED RESEARCH

This invention was made with Government support under Contract No. DE-EE0006869 awarded by the U. S. Department of Energy to Lambda Technologies, Inc., and the Government has certain rights in this invention.

BACKGROUND OF THE INVENTION

Field of the Invention

The invention pertains to methods and apparatus for drying anode and cathode materials in the fabrication of lithium ion batteries. More specifically, it pertains to methods involving the simultaneous application of microwave heating and hot air drying.

Description of Related Art

In high volume production of electrodes for lithium ion batteries drying is the highest-cost unit operation. In conventional processing, anode or cathode slurries are cast onto metal foils and dried under highly controlled conditions in very long furnaces. The furnace length (which can be ~40 m long) is dictated by the limited rate at which water, N-methyl-2-pyrrolidone (NMP), or other selected solvent can be removed from the slurry. Higher temperature drying can increase the drying speed but can cause binder migration, surface cracking, particle segregation, orange peel defects or pore-blocking skin formation; in general, controlling these issues becomes increasingly difficult as the electrode thickness increases.

There is a need for improved drying processes to speed the drying process without creating the aforementioned defects, particularly when processing thicker electrodes.

Objects and Advantages

Objects of the invention include: providing an effective and rapid processing method for anode and cathode slurries to fabricate electrodes for lithium ion batteries; providing an improved drying process for inorganic slurry coatings on metal foil; providing a continuous drying process for slurry-coated metal foils; providing a drying process that prevents defect formation in lithium battery anode and cathode materials; providing a drying apparatus for lithium battery electrodes that is relatively compact; providing a more controllable and energy-efficient process for drying lithium battery electrodes; and providing a rapid processing method that enables the manufacture of thicker anodes and cathodes while minimizing binder segregation.

SUMMARY OF THE INVENTION

According to one aspect of the invention, an apparatus for processing battery electrodes comprises:

a microwave applicator cavity with slots on opposite ends to allow a continuous sheet to move through the cavity in a first direction;

a processing chamber constructed of microwave-transparent material, disposed within the applicator cavity and surrounding the continuous sheet, the processing chamber having slots to allow the continuous sheet to pass through it;

a microwave power supply to deliver power to the applicator cavity;

a source of heated gas providing a controlled gas flow through the processing chamber in a direction opposite the first direction; and, at least one temperature measuring device positioned to measure a surface temperature at a selected location on the continuous sheet as it passes through the processing chamber.

According to another aspect of the invention, a method for processing battery electrodes comprises:

depositing an electrode material as a wet slurry onto a continuous metal foil;

passing the coated metal foil through a microwave-transparent processing chamber disposed within a microwave applicator cavity; and, applying microwave power to the applicator cavity while simultaneously passing heated gas through the processing chamber in a direction opposite to the direction of movement of the coated metal foil.

According to another aspect of the invention, an apparatus for processing battery electrodes comprises:

a microwave applicator cavity with slots on opposite ends to allow a continuous sheet to move through the cavity in a first direction;

a processing chamber constructed of microwave-transparent material, disposed within the applicator cavity and surrounding the continuous sheet, the processing chamber having slots to allow the continuous sheet to pass through it;

a microwave power supply to deliver power to the applicator cavity;

a source of heated gas providing a controlled gas flow through the processing chamber in a direction opposite the first direction;

at least one temperature measuring device positioned to measure a surface temperature at a selected location on the continuous sheet as it passes through the processing chamber; and, a heated chamber, located downstream from the microwave applicator cavity and having slots in opposite ends to allow the continuous sheet to pass through it for further processing after exiting the microwave applicator cavity.

According to another aspect of the invention, a method for processing battery electrodes comprises:

depositing an electrode material as a wet slurry onto a continuous metal foil;

passing the coated metal foil through a microwave-transparent processing chamber disposed within a microwave applicator cavity;

applying microwave power to the applicator cavity while simultaneously passing heated gas through the processing chamber in a direction opposite to the direction of movement of the coated metal foil; and, passing the coated foil through a second chamber for further processing via conventional heating.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIGS. 1A-C illustrate schematically an apparatus in accordance with some examples of the invention. FIG. 1A illustrates a processing system; FIGS. 1B and 1C show the front cross sectional view and side views of the processing system, respectively.

DETAILED DESCRIPTION OF THE INVENTION

Microwave drying is well known and widely used in a number of industries, owing to the fact that microwave energy can penetrate for some distance into dielectric materials and is readily absorbed by water molecules. However, drying wet slurries on metal foils by conventional microwave drying using a fixed frequency (typically 2.45 GHz) creates arcing on the metal foil and is therefore not practical. The invention employs a variable frequency microwave (VFM) source, rapidly sweeping through a bandwidth of frequencies, to eliminate arcing and also to provide uniformity within the processing cavity. In some examples, the frequency range was typically 5.85 GHz to 6.65 GHz, but it will be appreciated that other ranges may work equally well depending on the cavity dimensions and other process variables. The basic VFM approach is well-known and taught in several U.S. patents [see, e.g., U.S. Pat. No. 5,321,222 for a basic description of the technique].

At the same time, it will be appreciated that rapid drying of a slurry coating that has been deposited onto a metal foil can lead to various defects. For example, rapidly drying the surface of the slurry coating can form a relatively dense "skin", which would be detrimental to the performance of a battery that relies on a large amount of porosity and accessible surface area in the electrodes for optimal electrical characteristics. The invention is therefore directed to process improvements that can speed processing and reduce the size of the process equipment while avoiding detrimental effects on the materials being processed.

Figure 1A:
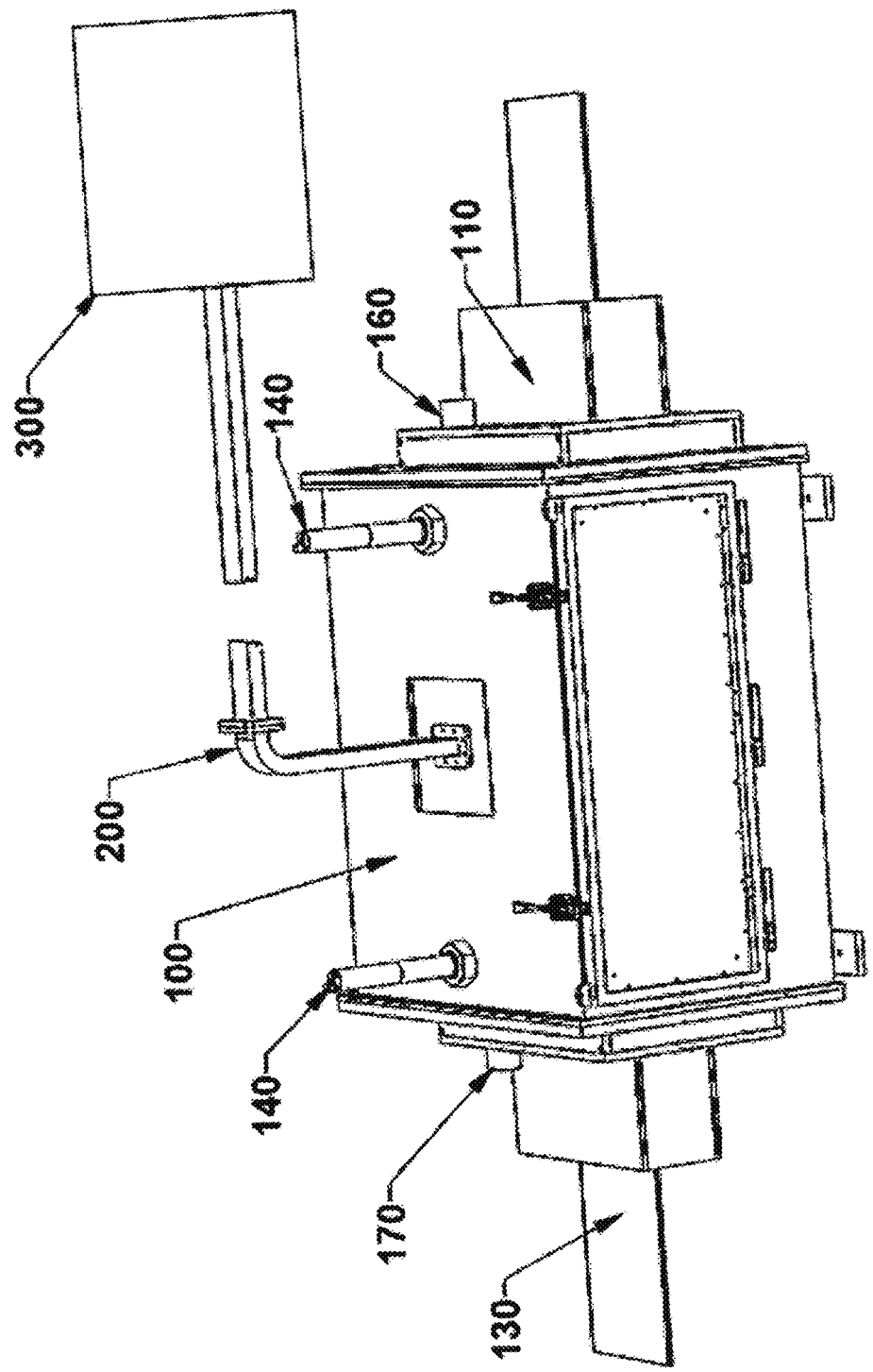
Figure 1B:
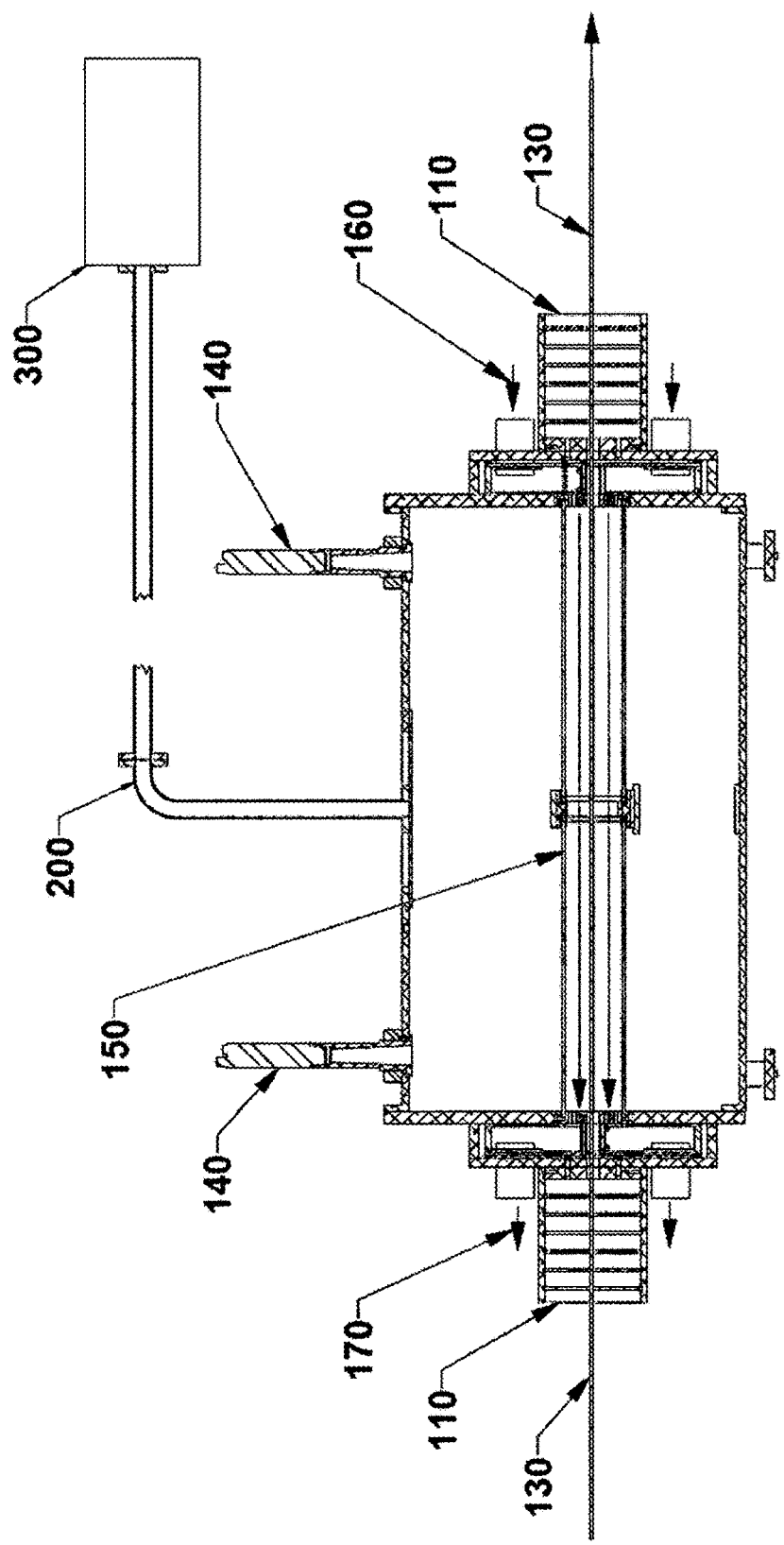

Referring to FIGS. 1A-C, an exemplary apparatus for processing battery electrodes comprises a cold-wall applicator cavity 100 of a suitable size and shape to accommodate foils of the desired thickness for the battery component to be manufactured. A port is provided on the upper surface of the cavity to admit microwave power, which is typically introduced via a conventional waveguide 200 and launcher. Microwave power is preferably provided by a VFM power supply 300 operating over a selected bandwidth as taught in the aforementioned patent literature. The applicator cavity contains a slot 120 at each end, to accommodate the passage of the coated metal foil, which is shown in FIG. 1B as running from left to right. Broadband microwave chokes 110 are preferably provided as shown, to minimize microwave leakage from the slots.

A processing chamber 150 is disposed within the applicator cavity 100, the purpose of which is to provide a controlled processing environment, contain the flow of heated gas, and manage the outflow of evaporating solvent from the film. This chamber is constructed of microwave-transparent material such as polymer, quartz, glass, or a ceramic material having low dielectric loss, and further has a slot in each end for the continuous sheet to pass through.

Heated gas (typically air, although any generally inert or nonreactive gas, e.g., nitrogen, may be used) is supplied by a blower or pump, not shown, entering as indicated in FIG. 1B on the right at 160 and exiting on the left at 170, so that the gas flows in the opposite direction from the movement of the passing metal foil 130. Applicants have discovered that the counter-flowing arrangement is important to achieving high efficiency (i.e., rapid drying) while avoiding deleterious effects such as skin formation on the electrode material. Part of the reason for this, as the skilled artisan will appreciate, is that the gas is most dry in the area where the film is also most dry (i.e., on the right in FIG. 1B), and the gas becomes progressively more moist as it moves toward the area where the film is likewise most moist. This produces a relatively even evaporation rate from the film and avoids skin formation that can occur if the wet film encounters very dry heated air at the "wet" end of the process.

At least one temperature monitor 140 is positioned to measure the temperature of the passing film, and preferably two such monitors are provided near the entry and exit points of the film from the chamber as shown in FIG. 1B. The monitors may be any type of non-contacting IR sensors, as are well known in the art.

The following examples will further illustrate various aspects of the inventive apparatus and describe exemplary processing conditions and the results that were observed.

Example

A microwave applicator cavity 100 was configured in the form of a rectangular prism 60×46×33 cm with 180×13 mm slots 120 on opposite ends, sufficient to accommodate a continuous sheet 130 typically 150-170 mm wide moving, as shown in FIG. 1B, from left to right at 1 cm/sec. A microwave choke 110 was placed on each end to suppress outward radiation of microwave energy. Each choke contained a set of slotted dielectric plates spaced to absorb microwave energy of the frequencies being used. VFM power was delivered via waveguide 200 from power supply 300 [MicroCure 1600-2000, Lambda Technologies, Morrisville, N.C.) operating over the range of 5.85 GHz to 6.65 GHz with a maximum power of 1600 W. Frequency sweeping covered 4096 discrete frequencies across the indicated bandwidth every 0.1 s, so that the dwell time at any one frequency was about 25 µs. Two IR sensors 140 [Williamson Silver Model U2-1] were placed as shown in FIG. 1B.

Example

A microwave-transparent processing chamber 150 was constructed as shown generally in FIG. 1B. The material used was 3 mm thick quartz and the inner cross-section dimensions were 210×58 mm extending over the entire 600 mm length of the metallic microwave cavity 100. The processing chamber or subcavity in this prototype system was constructed from quartz glass because of its very low dielectric loss at microwave frequencies. However, other materials such as low-loss ceramic materials or high performance composites used for radomes and electromagnetic windows (e.g. Saint-Gobain's RAYDEL® family of microwave transmissive polytetrafluoroethylene PTFE or Teflon® composites) may be suitable for larger production systems.

Example

A blower (not shown) supplies a controlled flow of heated gas into the right-hand end of the process chamber at 160. The gas exits from the left-hand end of the chamber at 170. The gas (typically air) is initially supplied at a temperature somewhat less than the boiling point of the solvent in the film (typically 85-90° C. for aqueous systems). The process chamber has slots 120 at the ends to allow the film to pass, and Applicants have discovered that in many cases it is preferable to add a second blower or pump to extract gas on the exit side 170 of the hot air path and operate the two blowers at substantially identical flow rates. It will be appreciated that this arrangement thereby creates a condition of essentially neutral pressure, i.e., the gas pressure inside the chamber is equal to that outside the chamber. As a consequence, there is virtually no convection of gas outwardly through the chamber slots and the temperature, humidity, composition, and flow of the gas past the moving film may be precisely controlled. This arrangement has the further advantage of eliminating waste or loss of process heat as well as avoiding the escape of annoying fumes into the workplace and the deposition or condensation of moisture or other contaminants in the microwave chokes.

Having described the key components and features of the apparatus, various aspects of the inventive process will be described to provide a fuller understanding of the process and how the apparatus provides a wide flexibility for process control and optimization.

The hot gas is typically introduced at a temperature $T_a$ preferably 10-20° C. lower than the intended process temperature $T_p$; thus for an aqueous slurry $T_a$ is preferably ~85-90° C. (This will warm up the inner process chamber. The purpose of the hot gas flow is two-fold. First, it carries away the solvent volatilized by the efficient penetration of VFM energy through the entire coating thickness; if the evaporated solvent molecules are not carried away they will have the tendency to condense back on the dried porous slurry or onto the walls of chamber 150. Second, the heated gas preheats the metal foil, which is not heated by the microwave energy and would otherwise act as a heat sink for the heat generated via dielectric loss in the slurry. The flow of hot gas is such that it carries the solvent molecules to the upstream side, where the freshly cast wet slurry coated foil enters the chamber, i.e. from the drier side to the wetter side. The lower hot gas temperature at the wet end ($<T_a$) will insure that there are no "orange peel" defects or pore-blocking skin formation, when the slurry cast electrode material enters the process chamber.)

VFM power is introduced into the applicator cavity 100 and passes into the microwave transparent chamber 150, penetrates the volume of the slurry film, interacts with the polar solvent molecules and drives them out to the surface of the coated slurry. (As the solvent evaporates the cooling effect associated with it will be observed on the IR sensor 140 monitoring the entrance slurry temperature $T_e$ on the left. As the web travels to the right and evaporation diminishes, the temperature will start to rise, reaching the process temperature $T_p$, by the time it arrives under the right-hand IR monitor 140. When the slurry coated foil arrives at the chamber exit on the right, the penetrating VFM has driven much of the moisture out of the slurry thickness and as the coated foil approaches the hot gas entrance side where the hot gas temperature is the highest, the hot gas primarily carries out a surface drying function. Thus, the invention exploits a synergy of the microwave-driven internal heating and drying and the hot gas driven surface drying. As a result, the electrode slurry can be dried very effectively and at temperature less than those required by conventional IR or hot air drying.)

It will be appreciated that optimizing the processing parameters will include adjusting the VFM power delivered into the chamber: higher microwave power will produce higher moisture or solvent removal and higher the process temperature $T_p$. It will be further understood that, in general, one will avoid process temperatures at or above the boiling point of the solvent (100° C. for aqueous slurries); otherwise voids can be created. To control the final exit temperature, the hot gas temperature $T_a$ can be decreased, so that the relatively cooler gas will dry and cool the electrode surface temperature, yet the higher microwave power will drive the rapid removal of solvent from the interior.

Another controllable process variable includes simultaneously reducing the flow rate for hot air and exhaust, which allows the surface temperatures to increase; this might be necessary at temperatures where higher air flow may cool the foil electrode more than desired.

Another process variable is the speed of the web, which can be adjusted for various loadings, and as the web speed is varied the above parameters can be optimized through routine experimentation to provide drying of a thick slurry without orange peel defects or pore-blocking skin formation.

The adjustability of variables described above allows the user to adapt the process for different slurry compositions and thicknesses, and for slurries containing other solvents. Solvents may include, but are not limited to, water and NMP. In each case, rapid solvent removal will be possible at relatively lower temperature, without creating problems (orange peel defects or pore-blocking skin formation and binder migration) normally associated with otherwise high temperatures or rapid drying.

Although in principle the invention may be usefully employed in the drying of virtually any wet slurry on a metal foil, it is particularly applicable to anode or cathode slurry mixtures formed on metal foil by any suitable process. Such slurries typically comprise a mixture of various inorganic particulates, a binder phase, and a volatile solvent. In the following examples, electrode slurries were cast onto metal foils by conventional methods. Some drying experiments were conducted in a static environment, in which a sample of coated foil was placed in a microwave cavity and was not moving as a continuous sheet or web; in other cases, the slurry was deposited continuously onto a moving metal foil, which passed through the process as generally shown in FIGS. 1A-B at a predetermined speed. These will be referred to as "static" and "dynamic" tests, respectively.

Example

An anode was prepared as follows: 97 wt. % natural graphite powder and 3 wt. % aqueous binder [styrene-butadiene rubber (SBR)] were mixed with water to form an anode slurry at 50% solids content, using a Flacktek SpeedMixer DAC150. The slurry was cast onto a 10 μm Cu foil using a doctor blade casting applicator. The coated anode was dried under static conditions in the VFM chamber with flowing hot air at 80° C. With VFM power on, the slurry temperature reached 95° C. and coating was dried in 1 minute to form an anode with a loading of 11 mg/cm$^2$.

A similarly prepared anode was conventionally dried with flowing hot air at 95° C. for comparison. The coating was dried in 5 minutes to form an anode with a loading of 11 mg/cm$^2$. The inventive process, in this example, provides a five-fold improvement in process speed.

Example

A cathode structure was prepared as follows: 93 wt. % NCM (Ni—Co—Mn oxide) powder, 3 wt. % conductive carbon, and 4% polyvinylidine difluoride (PVDF) binder were mixed with NMP to form a cathode slurry at 60% solids content by using a Flacktek SpeedMixer DAC150. The slurry was cast onto a 20 μm Al foil using a doctor blade casting applicator. The coated cathode was then dried under static conditions by the inventive method with flowing hot air at 100° C. When VFM power was on, the temperature reached 110° C. and the coating was dried in 3.5 minutes to form a cathode with a loading of 18 mg/cm$^2$.

When the coated cathode was dried conventionally with flowing hot air at 110° C., the coating dried in 7 minutes to form a cathode with a loading of 18 mg/cm$^2$. The inventive process, in this example, provides a two-fold improvement in process speed.

The following examples present some of the analytical comparisons performed on samples dried by the standard method as well those dried with the inventive Advanced Drying Process (ADP).

Example

Wet Adhesion Test

Electrodes prepared with standard and ADP method were soaked in electrolyte for 2 h at 80° C. then cooled to room temperature. The adhesion of the electrode material to the metal foil was tested using the visual cross hatch comparison method, which is well known in the paints and coatings industry. In this method, the coating is scored in two orthogonal directions using a razor blade to form a cross-hatched pattern. Poor adhesion will cause some coating material to separate from the substrate and break away near the cut lines. In this test, both samples (conventional and microwave processed) showed similar adhesion.

Example

Moisture Analysis

Moisture analysis was also performed on the samples prepared by standard convection drying as well as by the inventive ADP method. The measured solvent content of the conventionally dried film was 1968.97 ppm, whereas that of the film processed by continuous ADP drying was 1974.02 ppm. In both cases, therefore, the solvent content (as dried) was ~2000 ppm (the target value is <5000 ppm) for both samples, even though the sample was dried using the inventive process in a fraction of the time required by the conventional method.

Example

Anode Formation Half Cell Testing

Figure 2:
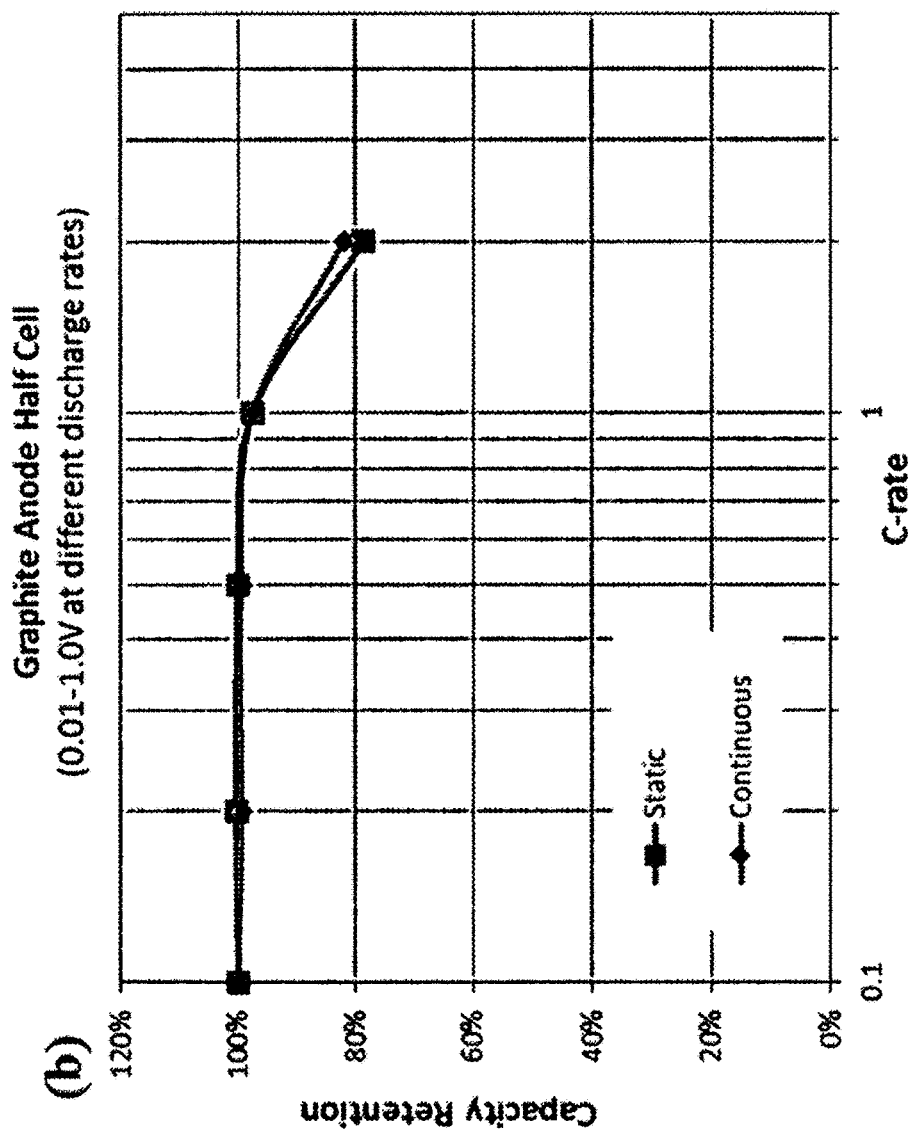
FIG. 2 presents capacity retention data for anode materials prepared according to one aspect of the invention.

The anode formation half-cell testing data comparison is shown in FIG. 2, which shows capacity retention vs. discharge rates expressed in terms of C for anode electrodes dried under standard static and continuous ADP conditions. [C=1 means that the battery is discharged at a rate that would deplete its nominal capacity in 1 hour; C=10 means that the battery is discharged in 1/10th of an hour; C=0.1 means that the battery is discharged in 10 hours]. Data are summarized below in Table 1.

TABLE 1

| Half-cell formation parameters[a] | | | | |
|---|---|---|---|---|
| Drying conditions | Loading (mg/cm$^2$) | (mAh/cm$^2$) | Reversible Capacity (mAh/g) | ICL (%) |
| Standard | 10.1 | 3.7 | 343.2 | 7 |
| Continuous ADP | 10.2 | 3.8 | 345.1 | 7 |

[a]The electrode is an anode with a water-based binder

FIG. 2 and Table 1 show results of the electrochemical characterization performed using half coin cells. Specific capacities and initial capacity loss (ICL) are similar for both sets of cells. Cells produced by static or continuous drying had almost identical cell voltage, and, as shown in FIG. 2, they have virtually identical capacity retention.

Example

Life Cycle Testing

Figure 3:
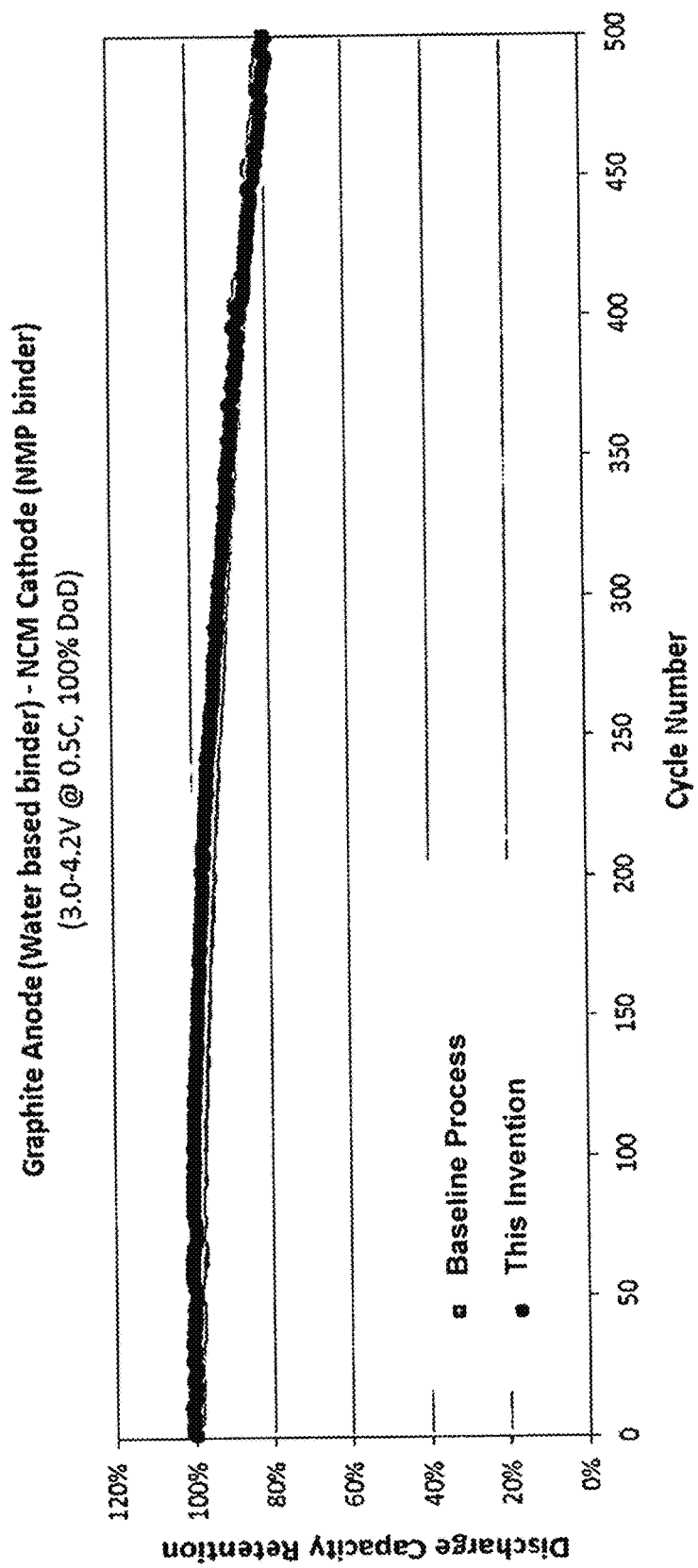
FIG. 3 presents discharge capacity retention for materials prepared according to another aspect of the invention and prepared by conventional methods.

Additionally, life cycle data for single layer pouch (SLP) cell [3.0 mAh/cm$^2$, at C/2,100% Depth of Discharge (DoD)] made with electrodes dried under both conditions is shown in FIG. 3. The plots show comparable performance between the baseline and the cell fabricated with the inventive ADP dried electrodes.

Example

Binder Migration

Figure 4:
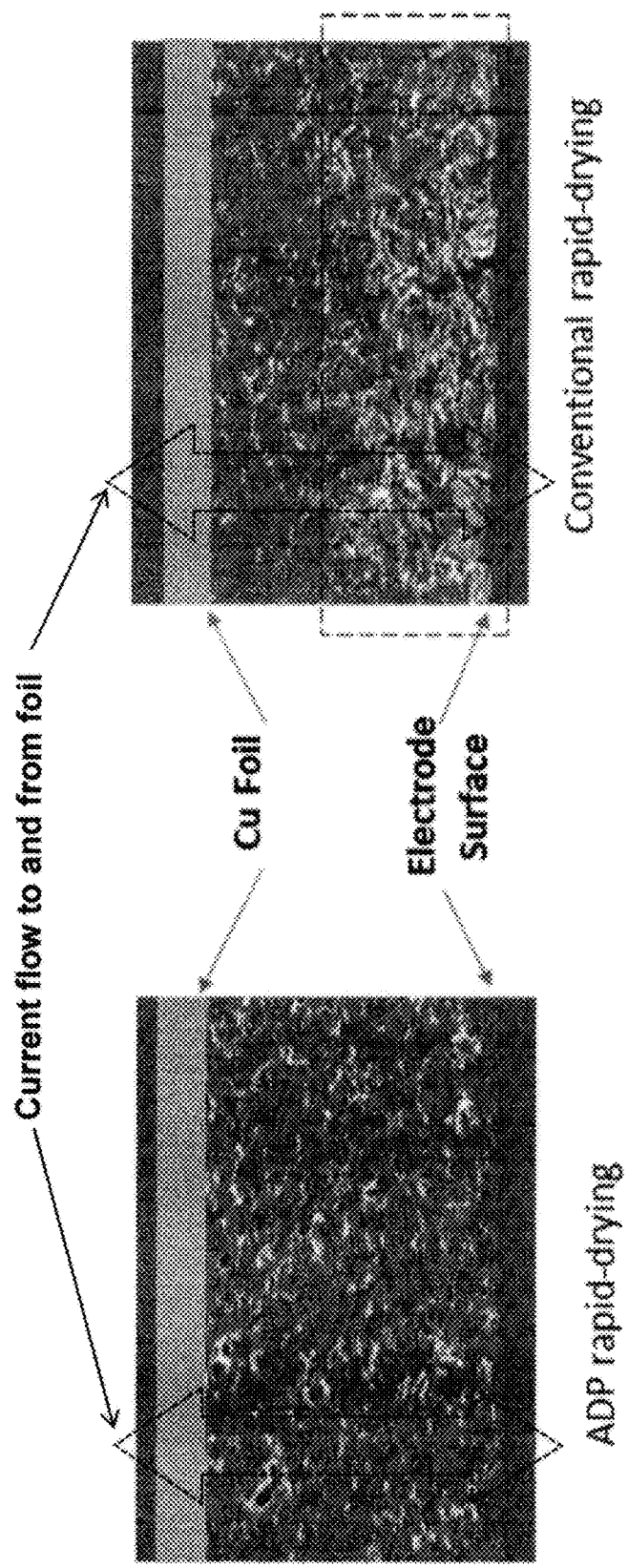
FIG. 4 compares the binder segregation observed by SEM, for materials prepared according to one aspect of the invention versus material dried rapidly by conventional methods.

All of the analytic work and data presented above shows that the inventive ADP produces virtually identical electrical properties to conventional drying while significantly reducing the overall drying time. More surprisingly, Applicants have discovered that the inventive process has a significant impact on the migration of binder within the film; ADP actually produces better properties compared to rapid drying attempts with conventional methods. FIG. 4 shows SEM photographs under backscattered mode for rapid ADP and rapid conventional drying. Each sample is shown in cross section, and the binder distribution is evident as bright spots relative to the darker gray graphite particles. There is clearly an advantage to using the inventive process (left), because binder segregation near the surface of the electrode (seen in the conventionally dried sample on right and indicated by the area bounded by dashed lines) will have various deleterious effects on mechanical and electrical performance.

Because the binder is uniformly dispersed within the material to begin with, the ratio of binder concentration near the electrode surface to that near the metal foil substrate therefore reflects the degree of binder migration during the drying process. A smaller number indicates a lower degree of binder migration, where a ratio of 1 implies zero migration. Table 2 below shows the ratios computed by image processing software for the two methods. ADP has minimal binder migration (1.05) whereas rapid conventional drying causes significantly higher binder migration (1.77).

TABLE 2

Binder migration

| Drying method | Binder concentration ratio[a] |
|---|---|
| This invention | 1.05 |
| Conventional | 1.77 |

[a]Binder at electrode surface/binder at Cu foil electrode interface

The above analytical data demonstrate that rapid ADP can meet all the battery specifications without any negative impact, whereas conventional attempts to rapidly dry the electrode slurries cause performance to deteriorate. A deficit in binder near the current collector can diminish adhesion and life of the cell. Excess binder at the electrode surface can lead to skin formation that impedes electrolyte access to the porous electrode structure.

Electrode manufacturing often includes a calendering step, in which the electrodes are compressed (typically between cylindrical rollers at pressure from 300-2000 kg/cm$^2$), which reduces the electrode thickness by a controlled amount and improves adhesion and density. Calendering may also influence the wetting of the electrode by the electrolyte.

Example

Some preferred ranges of process variables were determined for a graphite anode composition comprising 97 wt. % natural graphite powder and 3 wt. % aqueous styrene-butadiene rubber (SBR) binder:
VFM processing temperature: 70-95° C.;
Hot air temperature at entrance (with VFM): ambient to 90° C.;
Hot air temperature at entrance (no VFM): 80-150° C.;
Hot air flow rate: 150-350 L/min;
Foil speed through chamber: 100-500 mm/min.

Example

Some preferred ranges of process variables were determined for a cathode composition comprising 93 wt. % NCM (Ni—Co—Mn oxide) powder, 3 wt. % conductive carbon, and 4 wt. % polyvinylidine difluoride (PVDF) binder, using NMP as the solvent:
VFM processing temperature: 80-140° C.;
Hot air temperature at entrance (with VFM): 80 to 120° C.;
Hot air temperature at entrance (no VFM): 80-150° C.;
Hot air flow rate: 150-650° L/min;
Foil speed through chamber: 100-500 mm/min.

Example

A comparison was made using the graphite anode composition at a loading of 10.4 to 10.6 mg/cm$^2$. The coated substrate was moving at 500 mm/min in each case. The inventive process, using VFM and hot air, was accomplished using a chamber 0.5 m long. The conventional process, using a 2-zone IR heated system, used a chamber 2.5 m long. The invention, therefore, provided a five-fold reduction in the required length of the processing line.

Example

A similar comparison was made using a cathode composition of NCM523 and NMP-based binder. The loading was 18.2 mg/cm$^2$ (conventional process) and 18.9 mg/cm$^2$ (inventive process). In this case, the coated substrate was moving at 350 mm/min (conventional) and 225 mm/min (inventive). The lengths of the two chambers were the same as in the previous example. After allowing for the greater linear speed of the conventional drier, the invention still provided a three-fold improvement in overall efficiency.

Example

Adhesion and Binder Migration: Standard adhesion tests (performed using industry standards) were carried out on sample electrodes (anode and cathode) dried using conventional and advanced drying processes. Binder distribution measurements were done using elemental mapping on 4 to 6 sections of the film (anode or cathode) cross-section (from top to bottom). Binder distribution ratio, from electrode surface and near the metal foil substrate, should be under 1.3 in order to obtain acceptable electrode properties. The results may be summarized as follows: For the aqueous anode composition and a loading of 10 mg/cm$^2$, both conventionally processed and VFM processed samples passed the adhesion test, and the VFM processed samples had superior binder uniformity (1.07 vs. 1.19 for the conventional process). For the cathode composition using NMP as the solvent and a loading of 18 mg/cm$^2$, both conventionally processed and VFM processed samples passed the adhesion test, and the VFM processed samples had superior binder uniformity (1.03 vs. 1.09 for the conventional process).

Example

Cathode Binder distribution: Cathode electrodes dried conventionally and using the inventive process were analyzed in cross section by SEM to study the binder distribution, using fluorine concentration as a proxy for the PVDF binder material across the thickness of the electrode. Fluorine elemental maps indicated that the ratio of binder content (weight %) between surface and foil interfaces is 1.10 for the conventionally dried electrode. Conversely, the electrode dried under ADP has a ratio of 1.03. The latter confirms earlier observations, indicating less (or no) binder migration to the electrode surface when ADP is used to dry the electrodes. Examination of the structures by SEM also showed a finer, denser and more uniform microstructure of the electrode material produced by the inventive process compared to conventional drying.

Example

Anode Binder Distribution: Anode electrodes with a loading of ~10 mg/cm$^2$ dried conventionally and with the inventive ADP were analyzed using SEM (cross-sectional view) to study the binder distribution. Samples were stained with osmium tetroxide prior to SEM studies. Backscattered electron (BSE) microscopy was used to map osmium through the anode cross sections; the metal is visible as white bright spots on cross section micrographs. Using this method, the ratio of binder content between surface and foil interfaces, were 1.2 and 1.1 for conventional and ADP dried electrodes, Table 3. Again, Applicants observed a finer, denser, and more uniform microstructure of the electrode material for ADP as compared to conventional drying.

TABLE 3

Ratio of binder content in a zone vs. content near foil

| Zone | Conventional Drying | This Invention |
|---|---|---|
| 1 (near foil) | 1.0 | 1.0 |
| 2 | 1.04 | 1.09 |
| 3 | 1.15 | 1.07 |
| 4 | 1.18 | 1.13 |
| 5 (near surface) | 1.19 | 1.07 |

Example

Figure 5:
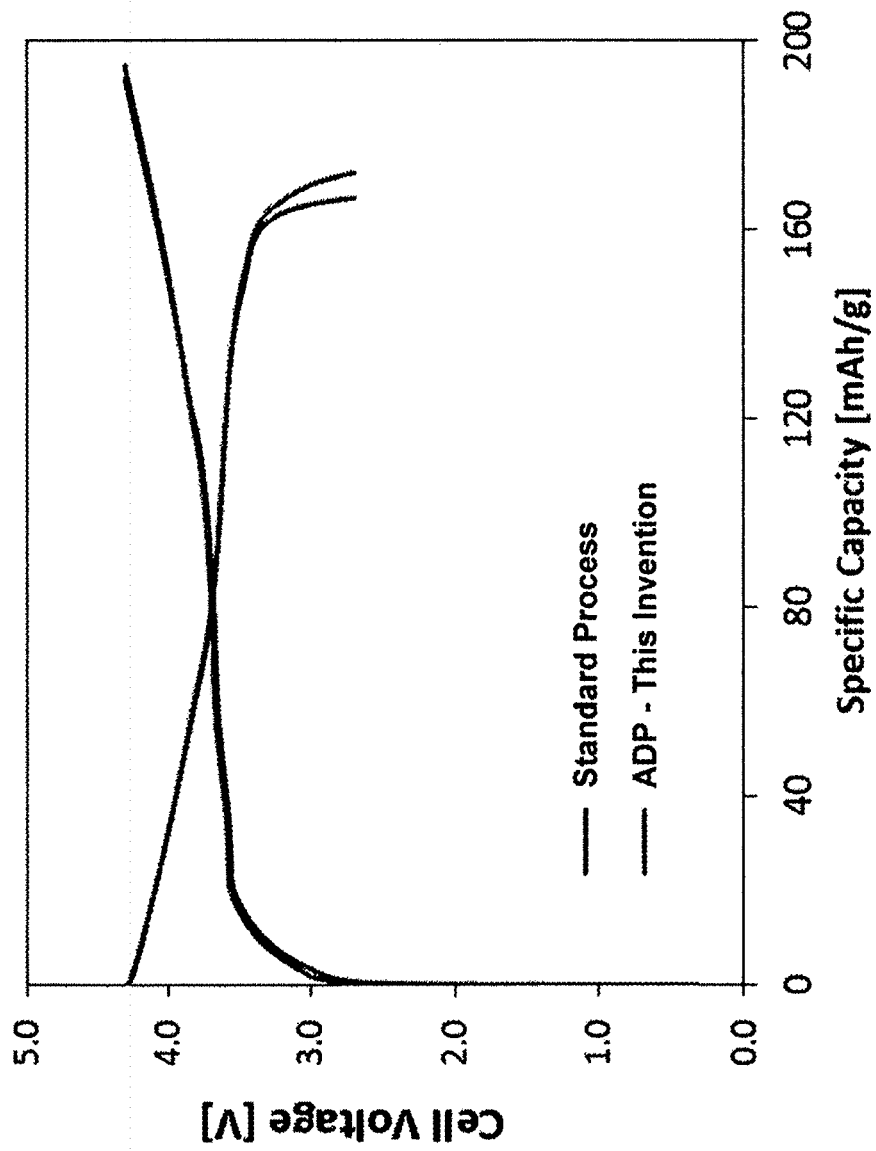
FIG. 5 shows first formation cycle for Single Layer Pouch (SLP) cells with electrodes (anode and cathode) dried using conventional and ADP drying systems; using CC-CV (Constant Current/Constant Voltage) charge and CC (Constant Current) discharge protocols at C/10 from 3.0 to 4.2V.

Electrochemical Performance: First formation cycle for single layer pouch cells with electrodes (anode and cathode) dried using conventional and ADP drying systems, was evaluated using Constant Current-Constant Voltage (CC-CV) charge and Constant Current (CC) discharge protocols at C/10 from 3.0 to 4.2 V, FIG. 5. In general, no difference has been observed during formation among ADP cells. The ADP cells show a slightly higher reversible capacity of 170.5 vs 166.4 mAh/g for standard cells, with an initial capacity loss (ICL) of 12% for ADP cells vs 13% for standard cells. Since the active materials are the same, the slight improvement may be attributed to the more uniform microstructure of ADP electrodes as discussed in earlier examples.

Example

Cycle life (100% SOC): Life cycle experiments for single layer pouch cells (both conventional and ADP dried electrodes) with 3.0 mAh/cm$^2$ loadings were performed at 0.5 C current rate (100% SOC). A cell with conventional anode and cathode made by standard processes was compared to a cell made using the inventive process (in each case the loading was equivalent to 3.1 mAh/cm and the initial capacity was about 142 mAh/g). Plots of discharge capacity retention versus cycle number were virtually identical between the baseline and the cell fabricated with ADP dried electrodes. After 500 cycles, the inventive cell retained 79% of initial capacity, compared to 78% for the conventional cell.

The preceding examples were for the continuous-cast single layer pouch cell. The following examples are for the 2.0 Ah High Energy (HEC) Prismatic Cells.

Example

Formation Cycles: Formation cycles were taken in all cells at C/10 from 3.0 to 4.2 V. Applicants observed that the voltage vs. specific capacity plots for cells with electrodes dried with conventional and ADP drying systems were virtually identical. It is worth emphasizing that no difference has been observed during formation of all cells, and ADP cells perform as well as the standard cells.

Example

Figure 6:
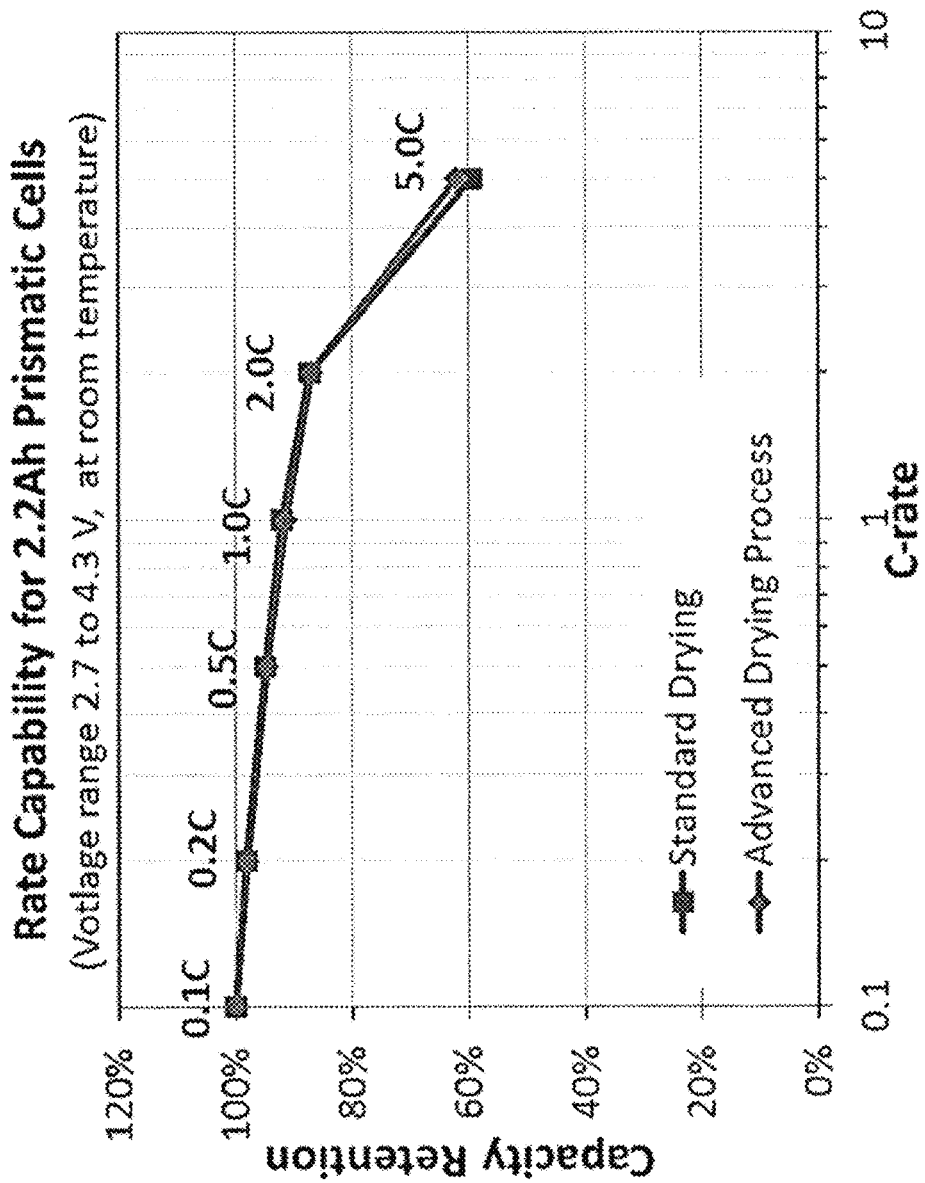
FIG. 6 shows rate capability plots where all cells were charged at 0.1 C, and discharged at 0.1, 0.2, 0.5, 1.0, 2.0 and 5.0 C.

Rate Capability: After formation, three standard and three ADP dried cells were used for rate capability experiments. Cells were charged at 0.1 C and then discharged at different C rates (0.1, 0.2. 0.5, 1.0, 2.0 and 5.0 C) from 2.7 to 4.2 V. Average discharge capacity retention is shown in FIG. 6. The rate performance shows that ADP dried electrodes are as good as the standard electrodes. At rates>2 C, ADP electrodes show slightly higher capacity retention than conventional cells, which Applicants speculate could be due to their more uniform microstructure.

Example

Electrochemical performance: Several standard and ADP cells (2.2 Ah) were fabricated. Formation cycles were taken in all cells at C/10 from 3.0 to 4.2 V, showing average reversible capacity of 2.0 Ah and 16% ICL for all cells. The cathode electrochemical loadings were set to 3.0 mAh/cm$^2$.

Life cycle testing was carried out for the prismatic cells (both conventional and ADP dried electrodes) at C/3 current rate from 3.5 to 4.2 V. At this voltage window the cell discharges to 80% (or 80% depth of discharge, DOD). After 500 cycles have been completed, Applicants observed capacity retention of 92% for cells made with both types of dried electrodes.

The foregoing comparisons demonstrate that ADP fabricated cells were identical in performance to the conventional process of record. However, in conducting these evaluations the internal VFM heating method has been demonstrated to minimize the binder migration to the surface. In addition, there is some evidence that the microstructure, porosity, pore size distribution, and tortuosity can be better controlled with rapid internal VFM heating and that should positively influence the electrical conductivity and performance of the battery electrodes.

It will be appreciated that the foregoing experiments were done using slurries that had been formulated and optimized for the conventional drying process. It is possible that improved slurry formulations may be developed that provide even greater benefits by optimizing solvent, solids loading, binder composition, etc., in view of the performance characteristics of the inventive microwave-based process.

Applicants recognize that various anode and cathode compositions are known to be of potential interest in the field of lithium ion batteries. Anode materials include lithium, graphite, lithium alloying materials, intermetallics, and silicon. Cathode materials include lithium-metal oxides such as $LiCoO_2$, $LiMn_2O_4$, and $Li(Ni_xMn_yCo_z)O_2$, vanadium oxides, and $LiFePO_4$. All of these materials require some kind of thermal treatment, such as drying, curing, or annealing, and the inventive apparatus may be adapted for such materials and processes through routine experimentation. The following example describes the use of the invention to process some alternative materials.

Example

To validate the robustness of the inventive process for various electrode materials, powders were mixed in appropriate ratios representing: a nanostructured Si—C composite anode; a $LiCoO_2$ (LCO) cathode; and a $LiNiCoAlO_2$ (NCA) cathode. Each slurry was cast individually on copper or aluminum foil and processed under optimized processing parameters in the inventive system. The results are presented in Table 4.

TABLE 4

Performance of the inventive drying system applied to different active materials

| Electrode | Binder | Electrochemical Loading, mAh/cm² | Process Benefit[a] |
|---|---|---|---|
| Si composite anode | LiPAA/water | 3.0 | 3.0 X |
| LCO cathode | PVDF/NMP | 3.2 | 3.0 X |
| NCA cathode | PVDF/NMP | 3.0 | 2.5 X |

[a]Benefit is defined as the ratio of the length of the conventional drying oven divided by the length of the inventive process chamber, corrected for changes in web speed It will be appreciated that the inventive process may not only be used instead of a conventional drying line, but it may also be used in combination with a significantly shortened conventional dryer. Operated as a "booster module" the invention makes use of the penetrating power of microwaves to drive out solvent from the bulk of the film, after which the film passes into the conventional dryer to perform rapid surface drying.

Example

A cathode slurry using NCM523 powder at 55% solids content was applied to a film at an electrochemical loading of 3.0 mAh/cm². Using the ADP system along with a conventional drying oven having four independently-controlled heating zones, cathode films were coated and dried at a web speed of 800 mm/min, which in this case was limited by the speed of the casting stage. No defects were observed in the dried films.

In further tests, films with mass loading equivalent to capacities as high as 4.0 mAh/cm² were also processed. Without the inventive system, surface cracks were observed in these coatings. However, when the VFM system was engaged, the films were completely dried without forming surface defects. Use of VFM heating allowed the power and temperature of the convection oven to be reduced by ~20%, Table 5.

The cathode slurry was coated and dried at ~1000 mm/min. Without using the ADP system there were surface cracks and residual wet spots. With a slight increase in power and temperature, the combination of the inventive ADP and convection drying made it possible to completely dry the films without any defects.

TABLE 5

Process results for conventional drying with and without a VFM stage

| Run | Loading mg/cm² | Drying Method | $T_a$ | Air Opening | Zone Power,% |
|---|---|---|---|---|---|
| 1 | 17.8 | hot air | 90 | 12.5% | 65/70/75/80 |
| 2 | 25.1 | hot air | 90 | 12.5% | 65/70/75/80 |
| 3 | 24.4 | 95% VFM | 110 | 25.0% | 60/60/65/70 |
| 4 | 25.5 | 95% VFM | 110 | 25.0% | 60/60/65/65 |
| 5 | 24.6 | 95% VFM | 130 | 25.0% | 60/65/65/70 |

| Run | Speed mm/min | Binder migration[a] | | | |
|---|---|---|---|---|---|
| | | Surface | Zone 2 | Zone 3 | Zone 4 | Foil |
| 1 | 800 | 1.14 | 1.06 | 0.89 | 0.96 | 1.00 |
| 2 | 800 | 1.87 | 1.59 | 1.24 | 1.23 | 1.00 |
| 3 | 800 | 1.10 | 1.12 | 1.22 | 1.04 | 1.00 |
| 4 | 800 | 1.46 | 1.27 | 1.09 | 1.05 | 1.00 |
| 5 | 1000 | 1.48 | 1.29 | 1.18 | 1.10 | 1.00 |

[a]Defined as the ratio of binder content in a particular section of the coating divided by the binder in the section closest to the metal foil substrate The above examples demonstrate the robustness of the invention to process a variety of electrode materials, increase the mass loading and the drying speed, without any compromise of properties. In fact, the rapid internal heating with VFM actually improves (reduces) the binder migration observed with even slower convection drying methods.

The above examples describe the case of drying single sided wet cast slurries on metal foils. It will be appreciated that there are methods to coat both sides of the metal foils and the skilled artisan will see that the inventive apparatus and method may easily be modified to dry both sides by allowing VFM exposure and hot air flow on both the top and bottom sides of the metal foil. Furthermore, the invention is not only applicable to electrode materials applied to a metal substrate by casting or doctor blading; spray coating, dip coating, screen printing, extrusion, or any other suitable means may be used to deposit the electrode material onto a substrate. Furthermore, the substrate may be metallic or nonmetallic (e.g., a polymer film) and, alternatively, the substrate may be a metal mesh or screen embedded in the porous electrode material. Li-ion batteries can be fabricated by sequentially spraying the component slurries onto desired surfaces. The slurry might be applied to selected areas using masks, jet printers, or other means to create a particular device geometry. For some multilayer energy storage devices, an activation step involves heating the layers to temperatures that range from 50° C. to about 150° C. This activation step can also easily be performed with the inventive apparatus. The multilayer energy storage material can also be deposited, screen printed or electro-coated on to the substrate, before it enters the apparatus shown in for the desired thermal treatment.

A separator is a critical component in liquid electrolyte batteries; it is placed between the positive electrode and negative electrode to prevent physical contact of the electrodes and also enabling free ionic transport and isolating electronic flow. The separator, anode and cathode can be individually formed into sheets or films, which are subsequently stacked or rolled to form the battery. Alternatively, the electrode material can be applied onto the separator (referred to as integrated electrode separators), which can be used in lithium ion batteries as replacements for free standing separators. Thus, the separator alone and/or electrode material or any other web configuration can be heat treated by passing through the inventive apparatus.

The apparatus depicted in FIG. 1 is shown with the web passing through in a substantially horizontal plane. It will be appreciated, however, that the cavity and slots may equally well be oriented so that the web passes in a substantially vertical plane. Such a configuration may be particularly useful for processing a metal sheet having coatings on both sides, because it eliminates the need for rollers or other supporting structures that might otherwise interfere with processing a web that has a wet coating on both sides. The vertical configuration would also be useful when processing a web in which the substrate forms an internal mesh completely contained within a slurry, rather than a solid sheet with a slurry on one side.

As used herein, the terms "wet" and "dry" imply greater or lesser amounts, respectively, of a volatile solvent, which may be water or may be an organic solvent, such as NMP, that has at least a partially polar nature so that it will absorb microwave energy efficiently. Thus, while the relatively "wet" end of a coated film enters the chamber and the relatively "dry" end exits the chamber, it will be understood that the actual solvent content of the exiting film will not, in general, be zero; it will simply be significantly less than that of the incoming film.

Similarly, the incoming "dry" heated gas, introduced adjacent to the dry end of the film, will have a lower concentration of solvent than will the "moist" gas exiting the chamber adjacent to the wet end of the film. In the case of non-aqueous solvents such as NMP, the concentration in the incoming gas may be very low, whereas in the case of aqueous systems, there will likely be some non-zero moisture content in the incoming air, but it will be significantly less than the moisture content or relative humidity of the air as it exits the wet end of the process.

It will be understood that the relative humidity of ambient air will by definition decrease when that air is heated. Such air will in many cases be suitable as is. However, if even lower incoming relative humidity is desired, the air may be dried or dehumidified by any suitable means prior to heating and injection into the chamber.

As noted earlier, Applicants have obtained excellent results using a VFM system, which, in one example, provided microwave power in a sweeping fashion over a bandwidth of ±400 MHz about a center frequency of 6.25 GHz. This represents a bandwidth of ±6.4% of the center frequency. Frequency sweeping has two clear advantages in this context: First, it eliminates arcing that might occur at the edges of a metal foil. Second, by creating a large number of independent modes within the cavity, more uniform heating is obtained. The skilled artisan will appreciate that uniformity in a cavity is a function of bandwidth, center frequency, and cavity dimensions relative to the microwave wavelength. A smaller cavity (relative to wavelength) will in general require a wider bandwidth of sweeping to achieve a given level of uniformity compared to a larger cavity. A user may therefore take these factors into account when engineering a system for a particular purpose. It will be further understood that various microwave power devices can produce power over a suitable bandwidth; these include traveling wave tube (TWT) amplifiers, solid state power amplifiers, and others.

The invention may be used with any suitable solvent. Table 6 lists some non-polar solvents, which have very small dipole moments as well as dielectric constants. The non-polar solvent molecules will not themselves respond well to microwaves, but it will be appreciated that some electrode materials are lossy to some degree at microwave frequencies and this will allow volumetric heating of the film, which is one benefit of the inventive process.

TABLE 6

Properties of some non-polar solvents

| Non-polar Solvents | Chemical Formula | Dielectric Constant | Dipole Moment | Boiling Point, ° C. |
|---|---|---|---|---|
| Pentane | $CH_3-CH_2-CH_2-CH_2-CH_3$ | 1.84 | 0.00 D | 36 |
| Cyclopentane | $C_5H_{10}$ | 1.97 | 0.00 D | 40 |
| Hexane | $CH_3-CH_2-CH_2-CH_2-CH_2-CH_3$ | 1.88 | 0.00 D | 69 |
| Cyclohexane | $C_6H_{12}$ | 2.02 | 0.00 D | 81 |
| Benzene | $C_6H_6$ | 2.3 | 0.00 D | 80 |
| Toluene | $C_6H_5-CH_3$ | 2.38 | 0.36 D | 111 |
| 1,4-Dioxane | $/-CH_2-CH_2-O-CH_2-CH_2-O-\backslash$ | 2.3 | 0.45 D | 101 |
| Chloroform | $CHCl_3$ | 4.81 | 1.04 D | 61 |
| Diethyl ether | $CH_3CH_2-O-CH_2-CH_3$ | 4.3 | 1.15 D | 35 |

In contrast, the polar solvents listed in Table 7 have significantly higher dielectric constants and dipole moments. Like water molecules, in the presence of microwave energy these polar molecules will be set into rotational movement. Anywhere these solvents are present, even deep into the pores of the porous dielectric film, microwave energy has the capability to agitate these molecules and help drive evaporation. It will be preferred to stay below the boiling point of the solvent or reagent to allow some additional rotational movement within the pores without boiling, which can lead to void formation.

TABLE 7

Properties of some polar solvents

| Polar Solvent | Chemical Formula | Dielectric Constant | Dipole Moment | Boiling Point, °C. |
|---|---|---|---|---|
| Water | H—O—H | 80 | 1.85 D | 100 |
| Ethanol | $CH_3$—$CH_2$—OH | 24.5 | 1.69 D | 79 |
| Methanol | $CH_3$—OH | 33 | 1.70 D | 65 |
| Isopropanol (IPA) | $CH_3$—CH(—OH)—$CH_3$ | 18 | 1.66 D | 82 |
| Acetic acid | $CH_3$—C(=O)OH | 6.2 | 1.74 D | 118 |
| Acetone | $CH_3$—C(=O)—$CH_3$ | 21 | 2.88 D | 56 |
| n-Propanol | $CH_3$—$CH_2$—$CH_2$—OH | 20 | 1.68 D | 97 |
| n-Butanol | $CH_3$—$CH_2$—$CH_2$—$CH_2$—OH | 18 | 1.63 D | 118 |
| Formic acid | H—C(=O)OH | 58 | 1.41 D | 101 |
| Propylene carbonate | $C_4H_6O_3$ | 64.0 | 4.9 D | 240 |
| Ethyl acetate | $CH_3$—C(=O)—O—$CH_2$—$CH_3$ | 6.02 | 1.78 D | 77 |
| Dimethyl sulfoxide | $CH_3$—S(=O)—$CH_3$ | 46.7 | 3.96 D | 189 |
| Acetonitrile (MeCN) | $CH_3$—C≡N | 37.5 | 3.92 D | 82 |
| Dimethylformamide | H—C(=O)N$(CH_3)_2$ | 38 | 3.82 D | 153 |
| Tetrahydrofuran | /—$CH_2$—$CH_2$—O—$CH_2$—$CH_2$—\ | 7.5 | 1.75 D | 66 |
| Dichloromethane | $CH_2Cl_2$ | 9.1 | 1.60 D | 40 |

We claim:

1. An apparatus for processing battery electrodes comprising:
   a microwave applicator cavity with an inlet slot and an outlet slot on opposite ends thereof to allow a continuous sheet to move through said cavity in a first direction;
   a processing chamber constructed of microwave-transparent material, disposed within said applicator cavity and surrounding said continuous sheet, said processing chamber having slots to allow said continuous sheet to pass through it;
   a microwave power supply to deliver power to said applicator cavity;
   a source of heated gas external to said processing chamber and proximate to one end thereof providing a controlled gas flow through said processing chamber in the direction opposite said first direction so that said gas exits said processing chamber at the end where said continuous sheet enters; and,
   at least one non-contacting temperature measuring device positioned to measure a surface temperature at a selected location on said continuous sheet as it passes through the processing chamber.

2. The apparatus of claim 1 wherein said microwave power is supplied in a sweeping fashion over a selected bandwidth.

3. The apparatus of claim 1 wherein said microwave-transparent material is selected from the group consisting of: quartz, glass, low loss ceramics, and microwave transmissive polymers and composites.

4. The apparatus of claim 1 wherein said source of heated gas comprises an inlet delivering gas to said processing chamber at a selected flow rate and at a selected temperature.

5. The apparatus of claim 4 wherein said source of heated gas delivers said gas at a selected temperature less than 240° C.

6. The apparatus of claim 4 wherein said source of heated gas further comprises an outlet extracting gas from said processing chamber at a rate equal to said selected inlet flow rate so that neutral pressure is maintained in said processing chamber.

7. The apparatus of claim 1 wherein said slots in said applicator cavity are provided with microwave chokes to reduce leakage of microwaves over an operative frequency range of said power supply.

8. An apparatus for processing battery electrodes comprising:
   a microwave applicator cavity with an inlet and an outlet slot on opposite ends to allow a continuous sheet to move through said cavity in a first direction;
   a processing chamber constructed of microwave-transparent material, disposed within said applicator cavity and surrounding said continuous sheet, said processing chamber having slots to allow said continuous sheet to pass through it;
   a microwave power supply to deliver power to said applicator cavity;
   a source of heated gas external to said processing chamber and proximate to one end thereof providing a controlled gas flow through said processing chamber in a direction opposite said first direction so that said gas exits said processing chamber at the end where said continuous sheet enters;
   at least one non-contacting temperature measuring device positioned to measure a surface temperature at a selected location on said continuous sheet as it passes through said processing chamber; and,
   a heated chamber, located downstream from said microwave applicator cavity and having slots in opposite ends to allow said continuous sheet to pass through it for further processing after exiting said microwave applicator cavity.

9. The apparatus of claim 8 wherein said microwave power is supplied in a sweeping fashion over a selected bandwidth.

10. The apparatus of claim 8 wherein said microwave-transparent material is selected from the group consisting of: quartz, glass, low loss ceramics, and microwave transmissive polymers and composites.

11. The apparatus of claim 8 wherein said source of heated gas comprises an inlet delivering gas to said processing chamber at a selected flow rate and at a selected temperature.

12. The apparatus of claim 11 wherein said source of heated gas delivers said gas at a selected temperature less than 240° C.

13. The apparatus of claim 11 wherein said source of heated gas further comprises an outlet extracting gas from said processing chamber at a rate equal to said selected inlet flow rate so that neutral pressure is maintained in said processing chamber.

14. The apparatus of claim 8 wherein said slots in said applicator cavity are provided with microwave chokes to reduce leakage of microwaves over an operative frequency range of said power supply.

\* \* \* \* \*